(12) United States Patent
Kaiser (10) Patent No.: US 11,933,889 B2
(45) Date of Patent: Mar. 19, 2024

(54) SENSOR ARRANGEMENT ON A VEHICLE

(71) Applicant: AUDI AG, Ingolstadt (DE)

(72) Inventor: Max Kaiser, Krautheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/779,434

(22) PCT Filed: Oct. 19, 2020

(86) PCT No.: PCT/EP2020/079363
§ 371 (c)(1),
(2) Date: May 24, 2022

(87) PCT Pub. No.: WO2021/121729
PCT Pub. Date: Jun. 24, 2021

(65) Prior Publication Data
US 2022/0413130 A1 Dec. 29, 2022

(30) Foreign Application Priority Data

Dec. 18, 2019 (DE) ...................... 10 2019 134 861.7

(51) Int. Cl.
G01S 13/931 (2020.01)
B60R 19/48 (2006.01)
G01S 7/481 (2006.01)

(52) U.S. Cl.
CPC .......... *G01S 13/931* (2013.01); *B60R 19/483* (2013.01); *G01S 7/4813* (2013.01); *G01S 2013/93271* (2020.01)

(58) Field of Classification Search
CPC .... G01S 13/931; G01S 7/4813; B60R 19/483
See application file for complete search history.

(56) References Cited

U.S. PATENT DOCUMENTS 7,347,464 B2 * 3/2008 Tanabe ................ B60R 21/0136
180/274
9,682,728 B2 * 6/2017 Taneda ................. B62D 25/085
(Continued)

FOREIGN PATENT DOCUMENTS

DE 102015119269 A1 5/2016
DE 102015209904 A1 12/2016
(Continued)

OTHER PUBLICATIONS

International Preliminary Report on Patentability directed to related International Patent Application No. PCT/EP2020/079363, dated May 17, 2022, with attached English-language translation; 11 pages.

*Primary Examiner* — Albert K Wong
(74) *Attorney, Agent, or Firm* — Sterne, Kessler, Goldstein & Fox P.L.L.C.

(57) ABSTRACT

A sensor arrangement for a vehicle includes a holding device holding a sensor and a connection arrangement connecting a holding device to a vehicle component. The connection arrangement moves the holding device between an operating position and at least one protecting position. The connection arrangement includes at least one lever arrangement that moves the holding device from the operating position to the at least one protecting position in response to an application of a collision force against the vehicle such that the holding device moves in at least one spatial direction including a first spatial direction, which corresponds to a first force component of the collision force. The connection arrangement includes at least one restoring arrangement that generates a restoring force applied against the at least one lever arrangement to move the holding device from the protecting position back to the operating position.

15 Claims, 4 Drawing Sheets

(56) References Cited

U.S. PATENT DOCUMENTS

| | | | | |
|---|---|---|---|---|
| 10,207,741 B2 * | 2/2019 | Klop | .................... | B60R 19/483 |
| 10,518,728 B2 * | 12/2019 | Furumoto | ................. | G01S 7/02 |
| 10,797,384 B2 * | 10/2020 | Singh | .................. | H01Q 1/3283 |
| 11,130,459 B2 * | 9/2021 | Kumashiro | ............. | B60R 19/03 |
| 11,292,410 B2 * | 4/2022 | Keysberg | ............. | G01S 13/931 |
| 11,529,890 B2 * | 12/2022 | Michaels | ............. | G01L 5/0057 |
| 2021/0086712 A1 | 3/2021 | Keysberg | | |
| 2021/0107418 A1 | 4/2021 | Schulz | | |
| 2022/0063531 A1 * | 3/2022 | Ginja | .................... | B60R 19/03 |
| 2023/0184898 A1 * | 6/2023 | Shim | ...................... | G01S 7/027 |
| | | | | 73/431 |

FOREIGN PATENT DOCUMENTS

| | | |
|---|---|---|
| DE | 102017009055 A1 | 3/2019 |
| DE | 102017009057 A1 | 3/2019 |
| FR | 3065433 A1 | 10/2018 |

* cited by examiner

SENSOR ARRANGEMENT ON A VEHICLE

TECHNICAL FIELD

The present invention relates to a sensor arrangement on a vehicle according to the embodiments disclosed herein.

BACKGROUND

Sensor arrangements for vehicles are known in numerous variations. Sensors installed in the vehicle are used for assistance programs, such as an emergency brake assistant. The corresponding sensor arrangements have the task of protecting a sensor from damage in the low-speed range in the event of a collision load, so that the sensor remains functional after such an impact. In this case, the sensors can be arranged in a protected position behind an external component, for example. Alternatively, the sensor arrangements can comprise connection arrangements which connect a holding device to at least one vehicle component so that it can move between an operating position and at least one protecting position. The holding device accommodates the sensor. A collision force caused by another party involved in the collision comprises a first force component which acts in a first spatial direction and moves the holding device proportionately in the direction of the corresponding first spatial direction into the at least one protecting position. A restoring force from at least one restoring arrangement transfers the holding device from the at least one protecting position into the operating position. In this case, the first spatial direction corresponds to a vehicle longitudinal direction.

A generic sensor arrangement is known from DE 10 2017 009 057 A1, wherein a sensor with a sensor-active surface is arranged on or behind an external add-on part of a vehicle. The sensor arrangement comprises a sensor guide, by means of which the sensor is connected to a first structural element of the vehicle such that it can pivot in the vehicle longitudinal direction. Moreover, the arrangement comprises a spacer means, by which the movement of the sensor in the vehicle longitudinal direction is limited to a maximum distance, corresponding to the usage position of the sensor, from a second structural element of the vehicle which is offset in relation to the first structural element in the direction of the vehicle interior. Moreover, the sensor arrangement comprises a restoring element which is designed to move the sensor in the rearward direction. The sensor is moved in the vehicle longitudinal direction due to an external force generated by a collision in a low-speed range.

DE 10 2017 009 055 A1 discloses an arrangement of a sensor having a sensor-active surface on or behind an external add-on part of a vehicle, which includes a sensor guide with a traction means made of a shape memory alloy and a restoring means. The sensor can be displaced out of an active position into a protecting position in the direction of the vehicle interior by means of the traction means in the event of an imminent detected collision load in the low-speed range and/or in the event of a detected collision load in the low-speed range. The sensor is displaceable from the protecting position back to the active position by means of the restoring means.

DE 10 2015 209 904 A1 describes a sensor arrangement with a connection arrangement on a vehicle.

SUMMARY OF INVENTION

The object of the invention is to provide a sensor arrangement on a vehicle which improves the protection of a corresponding sensor in the event of a collision load in the low-speed range.

This object is achieved by a sensor arrangement on a vehicle with the features of the disclosed embodiments. Alternative embodiments with expedient further developments of the invention are specified in the dependent claims.

In order to provide a sensor arrangement on a vehicle that improves the protection of a corresponding sensor in the event of a collision load in the low-speed range, the connection arrangement has at least one lever arrangement which, in addition to a force component of an effective collision force acting in the longitudinal direction of the vehicle, converts at least one force component of the collision force acting in a further spatial direction into a proportionate movement of a holding device in the corresponding spatial direction, wherein the at least one lever arrangement transfers the holding device into at least one protecting position in a resulting direction of action of the collision force.

A collision load in the low-speed range is understood below to mean an impact between at least two parties involved in a collision at speeds that are less than a predetermined threshold value. The threshold value lies, for example, in a speed range of 3 to 10 km/h, preferably at a speed of approximately 5 km/h.

A sensor arrangement is understood below to mean an assembly with a connection arrangement and a holding device. The holding device accommodates the sensor. The connection arrangement connects the holding device to at least one vehicle component in such a way that the holding device is movable between an operating position and at least one protecting position. A collision force transmitted by another party involved in the collision comprises a plurality of force components acting in a corresponding spatial direction, with at least one force component moving the holding device proportionately in the corresponding spatial direction into the at least one protecting position. A restoring force from at least one restoring arrangement transfers the holding device from the at least one protecting position into the operating position. Here, the holding device is transferred into at least one protecting position by the at least one lever arrangement in the resulting direction of action of the collision force.

The sensor arrangement is connected to a vehicle component of a vehicle front or a vehicle rear.

A sensor is understood below to mean a component with a sensor-active surface.

Advantageously, the holding device can be moved with the sensor in more than one spatial direction, as a result of which the holding device can be moved more flexibly away from another party involved in the collision or can be moved with the party involved in the collision. In addition, the holding device can also react to collision forces which are not transmitted to the holding device in the longitudinal direction of the vehicle or which do not directly impact the holding device or a sensor area of the holding device. As a result, the holding device can advantageously be moved away from the other party involved in the collision, even in laterally offset impact situations or in corner impact situations, in order to protect the sensor. Here, the holding device can be moved out of the operating position until the collision energy resulting from the collision force is converted into kinetic energy of the holding device and/or into frictional energy of the at least one lever arrangement. The position of the holding arrangement resulting from this movement corresponds to the protecting position. Here, many different protecting positions can be implemented depending on an impact angle of the other party involved in the collision and depending on the action of the collision force, wherein the at least one lever arrangement can adapt to the action of the collision force.

In an advantageous embodiment of the sensor arrangement according to the invention, a second spatial direction can correspond to a vehicle transverse direction and a third spatial direction can correspond to a vehicle vertical direction, with the at least one lever arrangement converting a force component of the collision force acting in the vehicle transverse direction into a proportionate movement of the holding device in the vehicle transverse direction and/or a force component acting in the vehicle vertical direction of the collision force is converted into a proportionate movement of the holding device in the vehicle vertical direction. Here, the holding device can be moved in a plane which is spanned by the vehicle longitudinal direction and the vehicle transverse direction. Additionally or alternatively, the holding device can be moved in a plane which is spanned by the vehicle longitudinal direction and the vehicle vertical direction. Alternatively, the holding device can be moved in a space which is spanned by the vehicle longitudinal direction, the vehicle transverse direction and the vertical direction of the vehicle. As a result, many alternative options for the holding device can be created.

In a further advantageous embodiment of the sensor arrangement according to the invention, a first lever arrangement can be coupled to a first end region of the holding device and to a first restoring arrangement, and a second lever arrangement can be coupled to a second end region of the holding device and to a second restoring arrangement. This can result in a symmetrical arrangement that can react flexibly to different collision scenarios. In addition, the lever arrangements can be moved against the restoring force of the corresponding restoring arrangement due to the impact of the collision force, as a result of which collision energy can also be converted into potential energy and the holding device can thus cover a shorter distance. As a result, a collision of the holding arrangement with a component arranged behind the holding arrangement in the vehicle longitudinal direction can be avoided or at least made more difficult.

In a further advantageous embodiment of the sensor arrangement according to the invention, the lever arrangements can each have at least one pivot arm and at least one holding arm, wherein the at least one pivot arm is coupled by a first end region to the corresponding end region of the holding device and by a second end region to the corresponding restoring arrangement. The at least one holding arm can be pivotably connected by a first end region to the at least one vehicle component and can be pivotably connected by a second end region to a holding region of the corresponding pivot arm, wherein the holding region can be arranged between the first end region of the pivot arm and the second end region of the pivot arm. Here, the at least one pivot arm can be pivoted about the holding region against the restoring force of the corresponding restoring arrangement. A movement of the holding device can thereby be made possible, wherein a relative movement between the at least one pivot arm and the at least one corresponding holding arm can be at least made more difficult or prevented. In addition, the movement can take place without distortion of the at least one holding arm and the at least one pivot arm. In this case, catching or jamming or twisting of the at least one pivot arm or of the at least one holding arm of the corresponding lever arrangement can be at least made more difficult or prevented.

In a further advantageous embodiment of the sensor arrangement according to the invention, the at least one pivot arm can have a first guide geometry on the holding region, which can interact in a centering manner with a second guide geometry arranged on the second end region of the holding arm. Additionally or alternatively, the at least one holding arm can have a third guide geometry on the first end region, which can interact in a centering manner with a fourth guide geometry arranged on the at least one vehicle component. In this case, the respective holding arm can be connected to the at least one vehicle component via a corresponding fastening adapter. The fourth guide geometry can therefore also be formed on the fastening adapter. Due to the interacting guide geometries, the corresponding pivot arm or the corresponding holding arm can be transferred better or more reliably into the operating position, in particular during a restoring movement. For implementation, one of the two interacting guide geometries can be designed, for example, as a negative mold and one of the two interacting guide geometries can be designed as a positive mold. In order to achieve a particularly good centering guiding effect, the interacting guide geometries can preferably each have a trapezoidal cross section. Of course, other suitable guide geometries can also be used which have a different cross section, such as a semicircular, triangular or elliptical cross section.

In a further advantageous embodiment of the sensor arrangement according to the invention, the restoring arrangements can each be coupled to the at least one vehicle component. The vehicle component can, for example, correspond to a structural component, such as a transverse support or a mounting support, which can securely and reliably hold the corresponding restoring arrangement without itself being deformed under the action of the collision force. The mounting support is preferably made of a plastics component and is screwed to the vehicle body at the front screwing points.

In a further advantageous embodiment of the sensor arrangement according to the invention, the restoring arrangements can each have at least one spring element. The at least one spring element can be designed as a helical spring, for example. A restoring force can be easily generated by the at least one spring element. In addition, dimensions and properties of the spring elements can be adapted to an existing installation space.

In an alternative embodiment of the sensor arrangement according to the invention, the restoring arrangements can each have at least one drive and at least one traction element, which is coupled to the at least one pivot arm. Here, the at least one drive generates the restoring force and transmits it to the at least one traction element. In addition, the restoring arrangements can each additionally comprise an overload protection with a disconnect arrangement which disconnects the at least one pivot arm from the at least one traction element. As the collision force decreases, the traction element and the pivot arm can be connected to one another again by means of a suitable arrangement. The traction element can correspond to a traction rod movably mounted in a receptacle or a traction cable or a telescopic extension. The restoring force can be adapted to the currently acting collision force by the drive. In addition, after the collision, the holding arrangement can be easily transferred into the operating position by the drive. In addition, a position of the holding arrangement and thus the position of the sensor in the operating position can be adjusted more precisely by the drive. As a result, the sensor can have a position which is preferred for determining sensor data.

In a further advantageous embodiment of the sensor arrangement according to the invention, the holding device can accommodate a controllable cooling air inlet. As a result, in addition to the sensor, the cooling air inlet can also be protected by the movably mounted holding device in the event of a collision load in the low-speed range. The cooling air inlet can have an open and a closed state. Since the cooling air inlet can be moved into the at least one protecting position in the low-speed range in the event of a collision load, the cooling air inlet can be arranged further forward in the vehicle longitudinal direction. Thus, in the closed state, a dynamic pressure can be reduced and an air conductance value of the vehicle can thereby be improved.

In a further advantageous embodiment of the sensor arrangement according to the invention, the holding device can comprise a frame which at least partially encloses the sensor. The frame can make direct contact between the other party involved in the collision and the sensor more difficult. In addition, the frame can direct a force away from the sensor.

In a further advantageous embodiment of the sensor arrangement according to the invention, the holding device can comprise at least one reinforcing rib. The reinforcing rib can divert the collision force or collision energy introduced into the holding device to the at least one lever arrangement or the at least one restoring arrangement, whereby a probability of damage to the holding device or the sensor or the cooling air inlet can be further reduced.

The features and feature combinations mentioned above in the description, as well as the features and feature combinations mentioned below in the description of the figures and/or shown only in the figures, can be used not only in the respectively specified combination but also in other combinations or in isolation without departing from the scope of the invention. Embodiments of the invention, which are not explicitly shown or explained in the figures but derive therefrom and can be produced by separated combinations of features from the embodiments explained, are thus to be regarded as included and disclosed.

BRIEF DESCRIPTION OF THE FIGURES

An embodiment of the invention is shown in the drawings and is explained in more detail in the following description. In the drawings, the same reference signs designate components or elements that perform the same or analogous functions. In the drawings.

DETAILED DESCRIPTION OF THE FIGURES

As can be seen from FIGS. 1 to 7, a sensor arrangement 10 on a vehicle has a connection arrangement 20 which connects a holding device 12 to at least one vehicle component 2 so that it can move between an operating position and at least one protecting position. The holding device 12 accommodates a sensor 60 to be protected. A collision force F caused by another party involved in the collision comprises a first force component FX acting in a first spatial direction R1, which moves the holding device 12 proportionately in the direction of the corresponding first spatial direction R1 into the at least one protecting position. A restoring force from at least one restoring arrangement 51 transfers the holding device 12 from the at least one protecting position back into the operating position. In the embodiment shown, the first spatial direction R1 corresponds to a vehicle longitudinal direction x.

According to an embodiment of the invention, the connection arrangement 20 has at least one lever arrangement 30, 40, which additionally converts at least one force component FY of the collision force F acting in a further spatial direction R2, R3, y, z into a proportionate movement of the holding device 12 in the corresponding spatial direction R2, R3, y, z, wherein the at least one lever arrangement 30, 40 transfers the holding device 12 into the at least one protecting position in a resulting direction of action WR of the collision force F.

Figure 2:
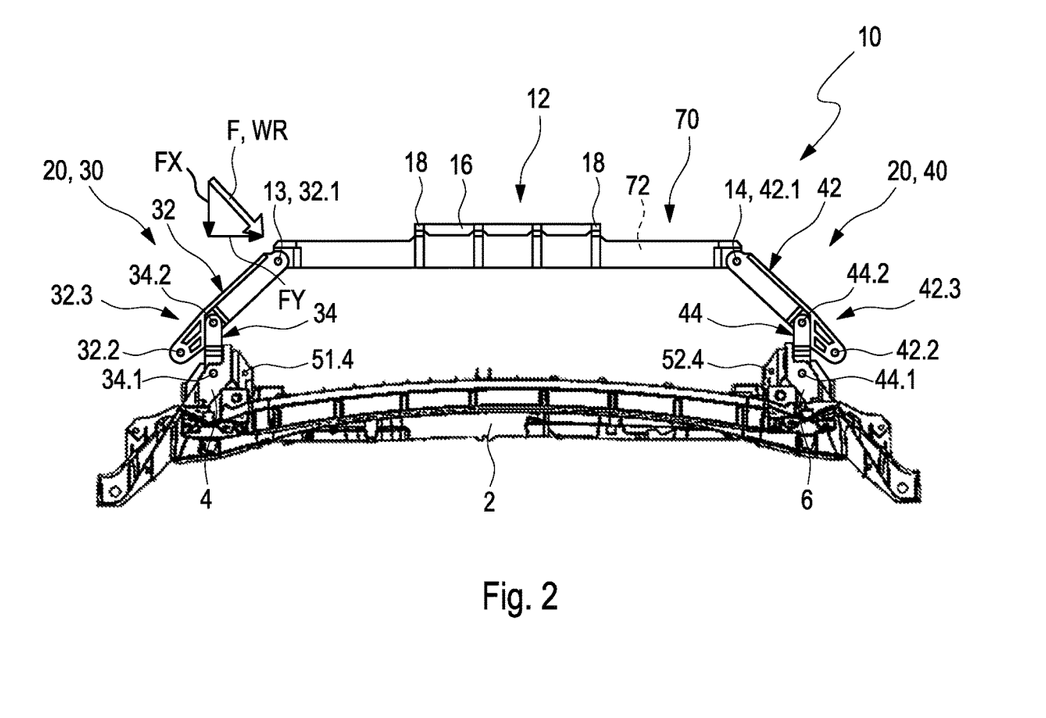
FIG. 2 is a schematic top view of the sensor arrangement from FIG. 1 in the operating position according to an embodiment of the invention.
Figure 3:
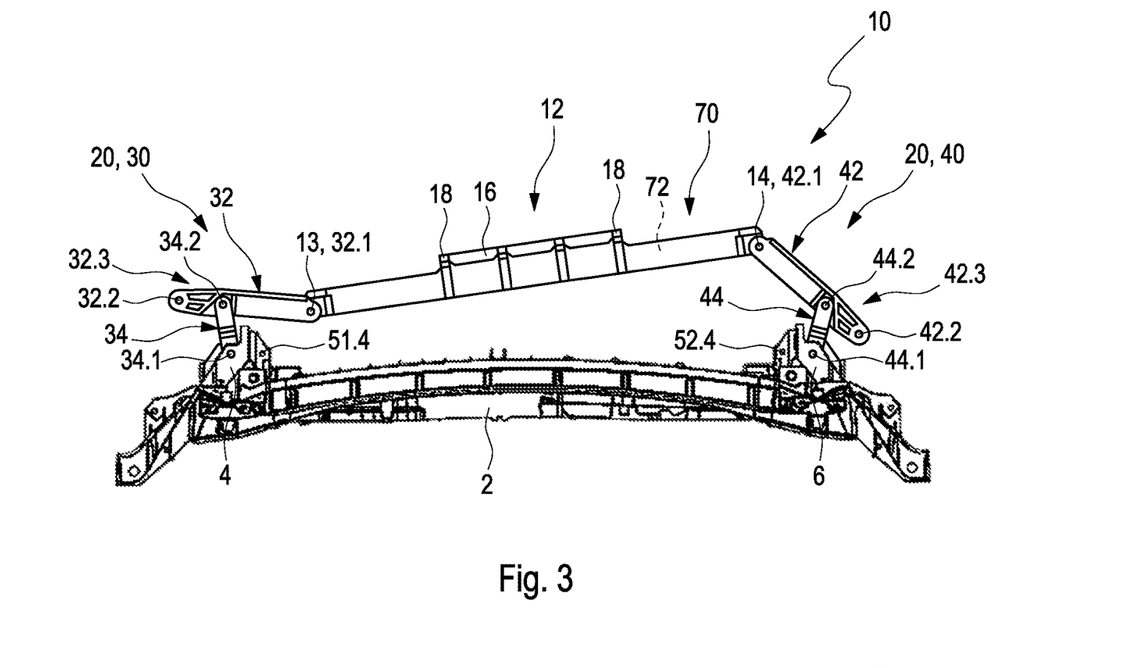
FIG. 3 is a schematic top view of the sensor arrangement from FIGS. 1 and 2 in a first protecting position according to an embodiment of the invention.
Figure 4:
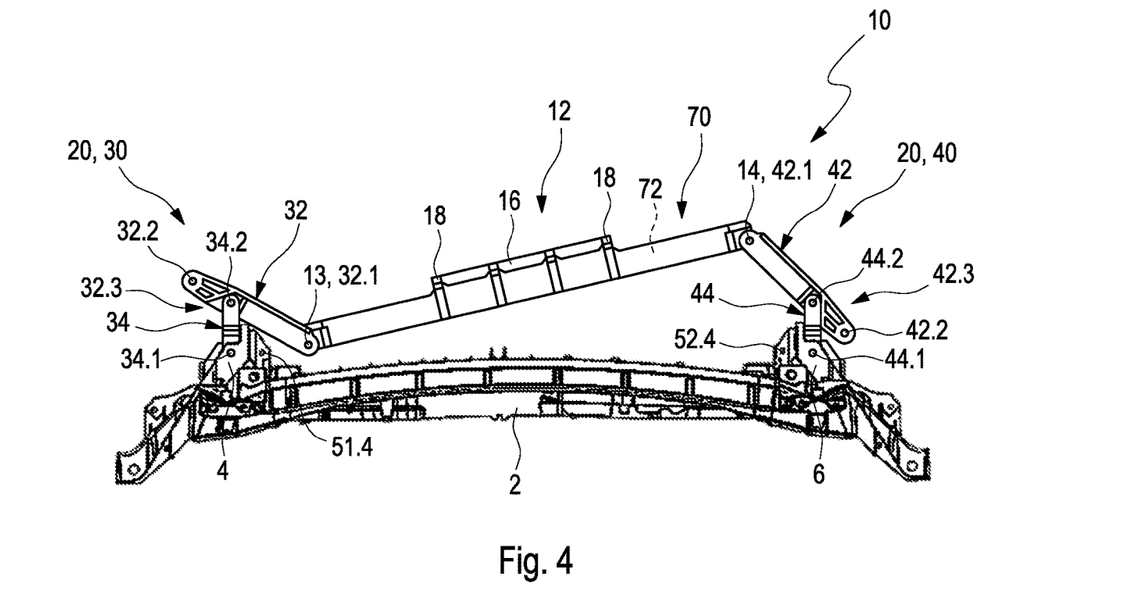
FIG. 4 is a schematic plan view of the sensor arrangement from FIGS. 1 and 2 in a second protecting position according to an embodiment of the invention.

As can also be seen from FIGS. 2 to 4, the connection arrangement 20 in the illustrated embodiment comprises two lever arrangements 30, 40 which are arranged in mirror symmetry with respect to a longitudinal axis of the vehicle.

As can also be seen from FIGS. 1 to 5, a second spatial direction R2 corresponds to a vehicle transverse direction y, and a third spatial direction R3 corresponds to a vehicle vertical direction z. In the illustrated embodiment of the two lever arrangements 30, 40, the two lever arrangements 30, 40 convert a force component FY of the collision force F acting in the vehicle transverse direction y into a proportionate movement of the holding device 12 in the vehicle transverse direction y. Here, the holding device 12 can move in a plane which is spanned by the vehicle longitudinal direction x and the vehicle transverse direction y.

In an alternative embodiment of the two lever arrangements 30, 40, not shown, the lever arrangements 30, 40 convert a force component FZ of the collision force F acting in the vehicle vertical direction z into a proportionate movement of the holding device 12 in the vehicle vertical direction z. Here, the holding device 12 can move in a plane which is spanned by the vehicle longitudinal direction x and the vehicle vertical direction z.

In a further alternative embodiment of the lever arrangement 30, 40, which is not shown, the lever arrangement 30, 40 converts a force component FY acting in the vehicle transverse direction y and a force component FZ of the collision force F acting in the vehicle vertical direction z into a proportionate movement of the holding device 12 in the vehicle transverse direction y or in the vehicle vertical direction z. Here, the holding device 12 can move in a space which is spanned by the vehicle longitudinal direction x, by the vehicle transverse direction y and by the vehicle vertical direction z.

Figure 1:
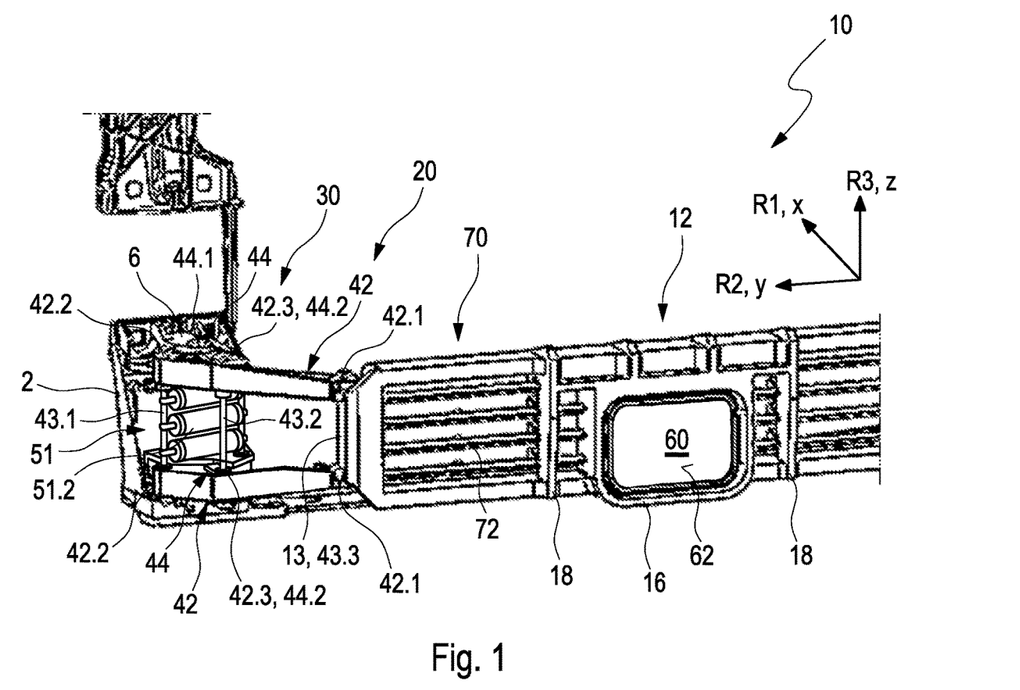
FIG. 1 is a schematic front view of a detail of a vehicle front with a sensor arrangement in an operating position according to an embodiment of the invention.

As can also be seen from FIGS. 1 to 7, in the embodiment of the connection arrangement 20 shown, a first lever arrangement 30 is coupled to a first end region 13 of the holding device 12 and to a first restoring arrangement 51 visible in FIG. 1. For the sake of clarity, the restoring arrangements 51 are not shown in FIG. 2-5. A second lever arrangement 40 is coupled to a second end region 14 of the holding device 12 and to a second restoring arrangement, not shown. In the embodiment shown, the holding device 12 runs in the vehicle transverse direction y and spans almost the entire width of the vehicle front. Here, the holding device 12 is arranged behind a fairing, not shown, for example a bumper cover. The fairing has a cutout which is arranged in alignment with the sensor 60 which is held by the holding device 12. The cutout of the fairing can essentially correspond to the dimensions of a sensor-active surface 62 of the sensor 60.

In the embodiment shown, the restoring arrangements 51 are connected to the vehicle component 2. In the embodiment shown, the vehicle component 2 corresponds to a mounting support designed as a plastics component, which is arranged behind the sensor arrangement 10 according to the invention in the vehicle longitudinal direction x and is screwed to the vehicle body at front screwing points. In this case, the collision force F does not act on the vehicle component 2, but only on the fairing, the holding device 12 and the connection arrangement 20.

As can also be seen from FIGS. 1 to 4, the illustrated lever arrangements 30, 40 each have at least one pivot arm 32, 42 and at least one holding arm 34, 44.

As can also be seen from FIG. 1, the lever arrangements 30, 40 in the embodiment of the connection arrangement 20 shown each have two pivot arms 32, 42 on both sides of the vehicle. The two pivot arms 32, 42 are arranged one below the other and run parallel to one another. This means that, seen in the positive vehicle longitudinal direction x, two first pivot arms 32 are arranged one below the other on the left-hand side of the vehicle, and two second pivot arms 42 are arranged one below the other on the right-hand side of the vehicle. In an alternative embodiment of the sensor arrangement 10 according to the invention, which is not shown, the lever arrangements 30, 40 can each have only one pivot arm 32, 42 or more than two pivot arms 32, 42 on the two sides of the vehicle.

As can also be seen from FIGS. 1 to 4, the pivot arms 32, 42 are each connected to the corresponding end region 13, 14 of the holding device 12 by a first end region 32.1, 42.1. The pivot arms 32, 42 are coupled to the corresponding restoring arrangement 51 by a second end region 32.2, 42.2.

As can also be seen from FIG. 1, the lever arrangements 30, 40 in the embodiment of the connection arrangement 20 shown have two holding arms 34, 44 on both sides of the vehicle. Each holding arm 34, 44 is associated with a pivot arm 32, 42. In addition, the holding arms 34, 44 of a lever arrangement 30, 40 are arranged one below the other and run parallel to one another. This means that viewed in the positive vehicle longitudinal direction x, two first holding arms 34 are arranged one below the other on the left-hand side of the vehicle, and two second holding arms 44 are arranged one below the other on the right-hand side of the vehicle. The holding arms 34, 44 are pivotably connected to the vehicle component 2 with a first end region 34.1, 44.1. In the embodiment shown, the first end regions 34.1, 44.1 of the holding arms 34, 44 are each connected to the vehicle component 2 via a fastening adapter 4, 6. The holding arms 34, 44 are pivotally connected by a second end region 34.2, 44.2 to a holding region 32.3, 42.3 of the corresponding pivot arm 32, 42, wherein the holding region 32.3, 42.3 is located between the first end region 32.1, 42.1 of the pivot arm 32, 42 and the second end region 32.2, 42.2 of the pivot arm 32, 42. The connection regions of the first end regions 34.1, 44.1 of the holding arms 34, 44 on the vehicle component 2 or on the fastening adapter 4, 6 do not correspond to the connection regions 51.4, 52.4 of the restoring arrangements 51 in the embodiment shown. As a result, a greater force can be transmitted from the restoring arrangement 51 to the corresponding pivot arm 32, 42. In an alternative embodiment of the sensor arrangement 10 according to the invention, which is not shown, the connection regions 51.4, 52.4 of the restoring arrangements 51 can be arranged on a different vehicle component 2 than the connection regions of the first end regions 34.1, 44.1 of the retaining arms 34, 44.

Figure 5:
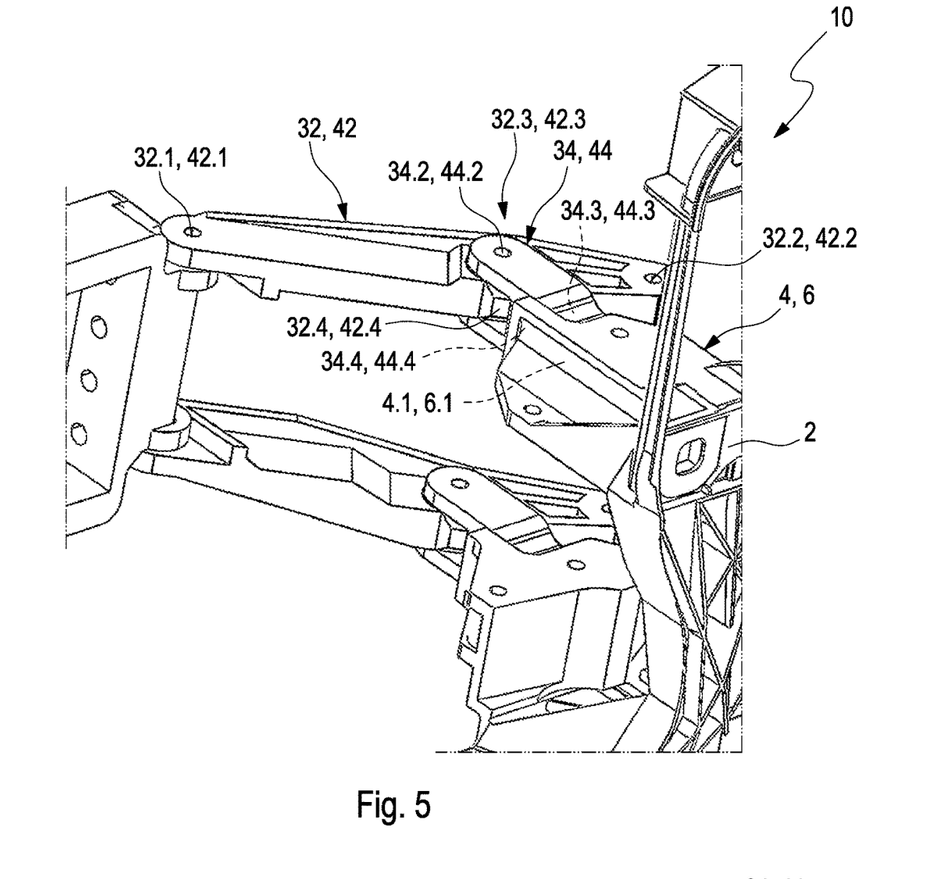
FIG. 5 is a schematic perspective side view in the vehicle longitudinal direction of the detail of the vehicle front from FIG. 1.
Figure 6:
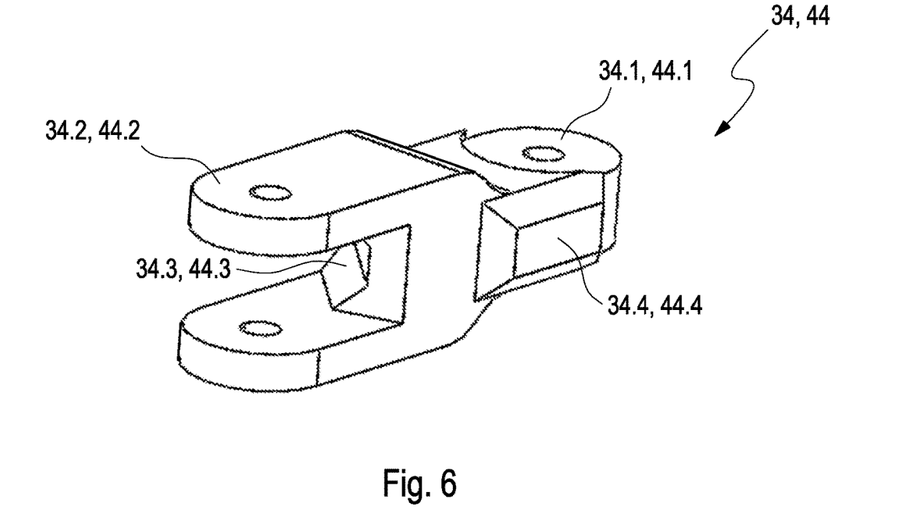
FIG. 6 is a schematic perspective representation of a holding arm of the sensor arrangement from FIGS. 1-5 according to an embodiment of the invention.
Figure 7:
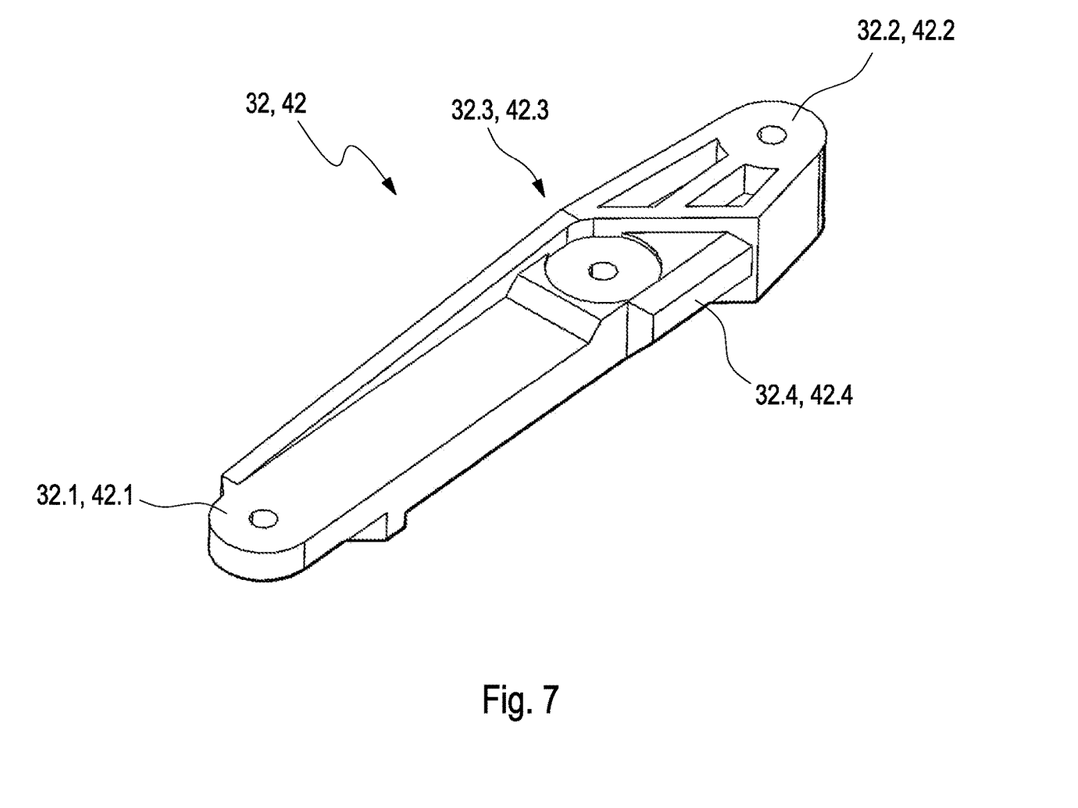
FIG. 7 is a schematic perspective representation of a pivot arm of the sensor arrangement from FIGS. 1-5 according to an embodiment of the invention.

As can be seen in particular from FIGS. 5 to 7, the pivot arms 32, 42 on the holding regions 32.3, 42.3 each have a first guide geometry 32.4, 42.4, which in each case interacts in a centering manner with a second guide geometry 34.3, 44.3 arranged on the second end regions 34.2, 44.2 of the holding arms 34, 44. In addition, the holding arms 34, 44 in the embodiment shown have a third guide geometry 34.4, 44.4 on the first end regions 34.1, 44.1, which interacts in a centering manner with a fourth guide geometry 4.1, 6.1 arranged on the at least one vehicle component 2. In the embodiment shown, the fourth guide geometries 4.1, 6.1 are each formed on the corresponding fastening adapters 4, 6. Due to the interacting guide geometries 32.4, 34.2; 42.4, 44.2; 34.4, 4.1; 44.4, 6.1, the corresponding pivot arm 32, 42 or the corresponding holding arm 34, 44 can be transferred better or more reliably into the operating position, in particular during a restoring movement. As can also be seen in particular from FIGS. 5 to 7, one of the two guide geometries 32.4, 34.2; 42.4, 44.2; 34.4, 4.1; 44.4, 6.1 is designed as a negative mold and one of the two interacting guide geometries 32.4, 34.2; 42.4, 44.2; 34.4, 4.1; 44.4, 6.1 is designed as a positive mold with a trapezoidal cross section. This means that the first guide geometries 32.4, 42.4 formed on the pivot arms 32, 42 are each formed as positive molds with a trapezoidal cross section. The second guide geometries 34.4, 44.4 formed on the holding arms 34, 44 are each formed as negative molds with a trapezoidal cross section. Analogously, the third guide geometries 34.4, 44.4 formed on the holding arms 34, 44 are each formed as positive molds with a trapezoidal cross section, and the fourth guide geometries 4.1, 6.1 formed on the fastening adapters 4, 6 are each formed as negative molds with a trapezoidal cross section. In alternative embodiments, which are not shown, guide geometries 32.4, 34.2; 42.4, 44.2; 34.4, 4.1; 44.4, 6.1 each have a semicircular or triangular or elliptical cross section.

As can also be seen from FIG. 1, the pivot arms 32, 42 of a lever arrangement 30, 40 in the embodiment of the lever arrangements 30, 40 shown are connected to one another via connecting webs 43.1, 43.2, 43.3. In this case, a first connecting web 43.1 is connected to restoring elements 51.2 of the corresponding restoring arrangement 51. The first connecting web 43.1 also connects the second end regions 32.2, 42.2 of the corresponding pivot arms 32, 42 to one another. A second connecting web 43.2 connects the holding regions 32.3, 42.3 of the corresponding pivot arms 32, 42 to one another. The corresponding holding arms 34, 44 can be connected to the corresponding holding region 32.3, 42.3 and the second connecting web 43.2 via a connecting element. A third connecting web 43.3 forms the corresponding end region 13, 14 of the holding device 12. The first end regions 32.1, 42.1 of the pivot arms 32, 42 are rotatably mounted on the corresponding connecting web 43.3. The connecting webs 43.1, 43.2, 43.3 run in the vertical direction of the vehicle z. In addition, the connecting webs run parallel to the axes of rotation or pivot axes of the corresponding pivot arms 32, 42. Due to the sensor arrangement 10 according to the invention, the holding device 12 moves in the resulting direction of action WR of the collision force F against the restoring force of the restoring arrangements 51 into the protecting position. After the collision, the holding device 12 moves back into the operating position due to the restoring force.

As can also be seen in particular from FIG. 1, the restoring arrangements 51 in the embodiment shown each have three spring elements which are arranged in a cylindrical receptacle 51.2. In an alternative embodiment of the restoring arrangements 51, which is not shown, these arrangements can have more or fewer than three spring elements. A length compensation can be created by the spring elements, which may be necessary during pivoting of the corresponding holding arms 34, 44 or pivoting of the pivot arms 32, 42.

In an alternative embodiment of the restoring arrangements 51 that is not shown, the restoring arrangements can each have at least one drive and at least one traction element, which is coupled to the corresponding pivot arm 32, 42. Here, the at least one drive generates the restoring force and transfers it to the at least one traction element. The traction element can be designed, for example, as a traction rod, traction cable, telescopic extension or other suitable element or other suitable arrangement. The drive can have an electric actuating element or a pneumatic actuating element or a hydraulic actuating element. In addition, a position of the holding device 12 and thereby a position of the sensor 60 or the sensor-active surface 62 can be adjusted by the actuating element. As a result, the sensor 60 can have a position which is preferred for determining sensor data. The restoring arrangements 51 can each include an overload protection with a disconnect arrangement. The disconnect arrangement disconnects the pivot arm 32, 42 from the corresponding traction element. In this case, the pivot arm 32, 42 is preferably connected to the corresponding traction element via a reversible connection, for example via a clip connection. A servomotor can bring the pivot arm 32, 42 and the corresponding traction element back together.

As can also be seen from FIGS. 3 and 4, the at least one protecting position of the holding device 12 is not clearly defined. The protecting position of the holding device 12 depends on various factors, such as the impact direction of the other party involved in the collision, the impact angle of the other party involved in the collision, the strength and the direction of action WR of the collision force F and the resulting acceleration of the holding device 12. In addition, the impact surface of the other party involved in the collision on the fairing and the friction between the holding arms 34, 44 and the pivot arms 32, 42 can contribute to the movement of the holding device 12.

In order to reach the protecting position shown in FIG. 3, the holding arms 34 of the lever arrangement 30 facing the collision force F are pivoted outwards from the operating position shown in FIGS. 1 and 2 and the first end region 32.1 of the corresponding pivot arms 32 is pushed backwards in the direction of the transverse support 2. As a result, the holding device 12 also pivots backwards. As a result, a force also acts on the opposing second lever arrangement 40. The corresponding holding arms 44 pivot in the direction of the vehicle exterior and the corresponding first end regions 42.1 of the pivot arms 42 pivot backwards in the direction of the transverse support 2. In this case, there is no relative movement between the holding device 12 and the bumper cover, which is moved in the direction of the transverse support 2 by the other party involved in the collision. The holding device 12 moves according to the deformation of the bumper cover and moves with the impact angle of the other party involved in the collision into the corresponding protecting position.

In order to reach the protecting position shown in FIG. 4, only the lever arrangement 30 which faces the effective collision force F is actuated. The holding arms 34 are not moved in the collision situation shown. The first end regions 32.1 of the corresponding pivot arms 32 are pivoted backwards in the direction of the transverse support 2 from the operating position shown in FIGS. 1 and 2. As a result, the corresponding end region 13 of the holding device 12 also pivots backwards. This creates a relative movement between the holding device 12 and the bumper cover.

As can also be seen from FIG. 1, the holding device 12 in the illustrated embodiment accommodates a controllable cooling air inlet 70. The cooling air inlet 70 has fins 72 which, in an open position, at least partially open an inlet opening and, in a closed position, completely close the inlet opening.

As can also be seen from FIG. 1, the holding device 12 comprises a frame 16 which at least partially encloses the sensor 60. This frame 16 can direct effective collision forces F away from the sensor 60. In addition, the sensor 60 can be movably mounted in the frame 16. The orientation of the sensor 60 can be set more precisely by a drive, for example. The drive can include an electric, pneumatic or hydraulic actuating element, as a result of which the sensor 60 can be rotated about a plurality of axes.

As can also be seen from FIG. 1, the holding device 12 in the illustrated embodiment comprises a plurality of reinforcing ribs 18. The reinforcing ribs 18 can be arranged congruently with reinforcing ribs of the bumper cover or a bumper transverse support.

LIST OF REFERENCE SIGNS 2 vehicle component
4, 6 fastening adapter
4.1, 6.1 fourth guide geometry (negative mold)
10 sensor arrangement
12 holding device
13 first end region
14 second end region
16 frame
18 reinforcing rib
20 connection arrangement
30 first lever arrangement
40 second lever arrangement
32, 42 pivot arm
32.1, 42.1 first end region (on holding device)
32.2, 42.2 second end region (on restoring arrangement)
32.3, 42.3 holding region (between the end regions)
32.4, 42.4 first guide geometry (positive mold)
43.1, 43.2, 43.3 connecting web
34, 44 holding arm
34.1, 44.1 first end region (vehicle component)
34.2, 44.2 second end region (pivot arm)
34.3, 44.3 second guide geometry (negative mold)
34.4, 44.4 third guide geometry (positive mold)
51 restoring arrangement
51.2 receptacle
51.4, 52.4 fastening region 60 sensor
62 sensor-active surface
70 controllable cooling air inlet
72 fin
x vehicle longitudinal direction
y vehicle transverse direction
z vehicle vertical direction
F collision force
FX first force component in the vehicle longitudinal direction
FY second force component in the vehicle transverse direction
WR direction of action of the collision force
R1 first spatial direction
R2 second spatial direction
R3 third spatial direction

The invention claimed is:

1. A sensor arrangement on a vehicle, comprising
a holding device configured to hold a sensor; and
a connection arrangement connecting the holding device to a vehicle component, the connection arrangement configured to move the holding device between an operating position and at least one protecting position, wherein the connection arrangement includes:
   at least one lever arrangement configured to move the holding device from the operating positon to the at least one protecting position in response to a collision force applied against the vehicle such that the holding device moves in at least one spatial direction including a first spatial direction that corresponds to a direction of a first force component of the collision force and in a second spatial direction that corresponds to a direction of a second force component of the collision force, wherein the first spatial direction corresponds to a vehicle longitudinal direction, and
   at least one restoring arrangement configured to apply a restoring force against the at least one lever arrangement to transfer the holding device from the at least one protecting position to the operating position.

2. The sensor arrangement according to claim 1, wherein the second spatial direction corresponds to a vehicle transverse direction, and wherein the at least one spatial direction of movement by the holding device includes a third spatial direction that corresponds to a direction of a third force component of the collision force, and the third spatial direction corresponds to a vehicle vertical direction.

3. The sensor arrangement according to claim 1, wherein the at least one restoring arrangement includes a first restoring arrangement and a second restoring arrangement,
wherein the at least one lever arrangement includes:
   a first lever arrangement coupled to a first end region of the holding device and coupled to the first restoring arrangement, and
   a second lever arrangement coupled to a second end region of the holding device and to the second restoring arrangement.

4. The sensor arrangement according to claim 1, wherein each lever arrangement includes a pivot arm and a holding arm,
wherein the pivot arm includes a first end region coupled to a corresponding end region of the holding device and a second end region coupled to a corresponding restoring arrangement,
wherein the holding arm includes a first end region pivotably coupled to the vehicle component and a second end region pivotably coupled to a holding region of the pivot arm,
wherein the holding region is disposed between the first end region of the pivot arm and the second end region of the pivot arm.

5. The sensor arrangement according to claim 4, wherein the pivot arm includes a first guide geometry disposed on the holding region of the pivot arm, and the holding arm includes a second guide geometry disposed on the second end region of the holding arm and complementary to the first guide geometry of the pivot arm such that the first guide geometry is moveably received on the second guide geometry.

6. The sensor arrangement according to claim 5, wherein the holding arm includes a third guide geometry disposed on the first end region of the holding arm, and the vehicle includes a fourth guide geometry complementary to the third guide geometry of the holding arm such that the third guide geometry is moveably received on the four guide geometry.

7. The sensor arrangement according to claim 6, wherein the first and third guide geometries are formed by a negative mold and the second and fourth guide geometries are formed by a positive mold complementary to the negative mold.

8. The sensor arrangement according to claim 6, wherein the first and third guide geometries each have a trapezoidal, a semicircular, a triangular, or an elliptical cross-section.

9. The sensor arrangement according to claim 1, wherein the at least one restoring arrangement is coupled to the vehicle component.

10. The sensor arrangement according to claim 1, wherein the at least one restoring arrangement includes a spring element.

11. The sensor arrangement according to claim 4, wherein the at least one restoring arrangement includes a drive element and a traction element coupled to a corresponding pivot arm of the at least one lever arrangement, and the drive is configured to generate and transmit the restoring force to the traction element.

12. The sensor arrangement according to claim 11, wherein the at least one restoring arrangement comprises an overload protection configured to disconnect the corresponding pivot arm from the traction element.

13. The sensor arrangement according to claim 1, wherein the holding device houses a controllable cooling air inlet of the vehicle.

14. The sensor arrangement according to claim 1, wherein the holding device comprises a frame that at least partially encloses the sensor.

15. The sensor arrangement according to claim 14, wherein the frame of the holding device comprises at least one reinforcing rib.

* * * * *